(12) United States Patent
O'Sullivan et al.

(10) Patent No.: US 7,895,049 B2
(45) Date of Patent: Feb. 22, 2011

(54) DYNAMIC REPRESENTATION OF GROUP ACTIVITY THROUGH REACTIVE PERSONAS

(75) Inventors: Joseph J. O'Sullivan, Oakland, CA (US); Marc E. Davis, San Francisco, CA (US); Rodrigo Lopez, Mountain View, CA (US); Cole J. Poelker, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 621 days.

(21) Appl. No.: 11/948,190

(22) Filed: Nov. 30, 2007

(65) Prior Publication Data

US 2009/0144211 A1 Jun. 4, 2009

(51) Int. Cl.
G06Q 10/00 (2006.01)
G06Q 99/00 (2006.01)
(52) U.S. Cl. .................................. 705/1.1; 705/319
(58) Field of Classification Search .................. 705/1.1, 705/319
See application file for complete search history.

(56) References Cited

U.S. PATENT DOCUMENTS

2003/0119531 A1* 6/2003 Patton et al. ................ 455/461
2005/0223328 A1* 10/2005 Ashtekar et al. ............ 715/706
2005/0248574 A1* 11/2005 Ashtekar et al. ............ 345/473
2007/0173726 A1* 7/2007 Kim et al. ................... 600/483
2008/0020361 A1* 1/2008 Kron et al. .................. 434/262

OTHER PUBLICATIONS

World of Warcraft, http://en.wikipedia.org/wiki/World_of_warcraft, pp. 1-16, Nov. 21, 2007.
Grand Theft Auto, http://en.wikipedia.org/wiki/Grand_Theft_Auto_%28series%29, pp. 1-8, Nov. 21, 2007.

* cited by examiner

*Primary Examiner*—Jonathan Ouellette
(74) *Attorney, Agent, or Firm*—Frommer Lawrence & Haug LLP; Jamie L. Wiegand

(57) ABSTRACT

Embodiments are directed towards managing an adaptive media object to dynamically represent a persona reflecting a group's (or individual's) online and/or offline activities and behaviors. The group selects the adaptive media object to represent their persona digitally. The group may indicate which activities, actions, and/or behaviors are to be used to adapt the persona, and may further specify at least one mapping of a selected activity, action, and/or behavior to a change in the configuration of the adaptive media object. In one embodiment, the various activities, actions, and/or behaviors may be input to a machine learning algorithm that dynamically determines the changes to the adaptive media object. The adaptive media object may serve as a single point of contact for the group or individual for communications. The adaptive media object configuration may also change based upon the client device used to access the adaptive media object.

24 Claims, 7 Drawing Sheets

DYNAMIC REPRESENTATION OF GROUP ACTIVITY THROUGH REACTIVE PERSONAS

TECHNICAL FIELD

The present invention relates generally to online social networking and, more particularly, but not exclusively to employing an adaptive media object that in real-time dynamically changes to reflect a person of a group and/or individual's online and/or offline activities.

BACKGROUND

In society, people with common goals and interests will often identify or represent themselves with symbols, pictures, or even sounds. Such representations take several forms. For example, a family shield is an "exclusive" representational form, in that it is intended to identify a particular group of people to the exclusion of others. A sports team mascot, may be considered to be an example of a more public or "inclusive" representational form, in that it often represents not only the members of the sports team, but also those persons that may feel an affinity towards the team.

Online representations tend to take the form of the group or individual through what is known as an avatar. An "avatar" typically is a graphical representation of an individual, whether in a three-dimensional model form, a two-dimensional form, or in a textual construct. Avatars traditionally have been used to represent a single person online and have struggled to represent groups of people in a meaningful manner. Furthermore, current forms for representing online groups (or individuals) provide little feedback regarding current activities, behavior, location, or state of the group or individual. While some data visualizations of groups and/or individual activities have been created for public consumption, little of it has been associated with the representation of the group or individual in real time. Thus, a viewer of the avatar may not be able to learn much about the current state of affairs of the group or individual. Moreover, the viewer may not know how to find out such information, or even whom to ask within a group to obtain the group's state of affairs, perspective on a given topic, or the like. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
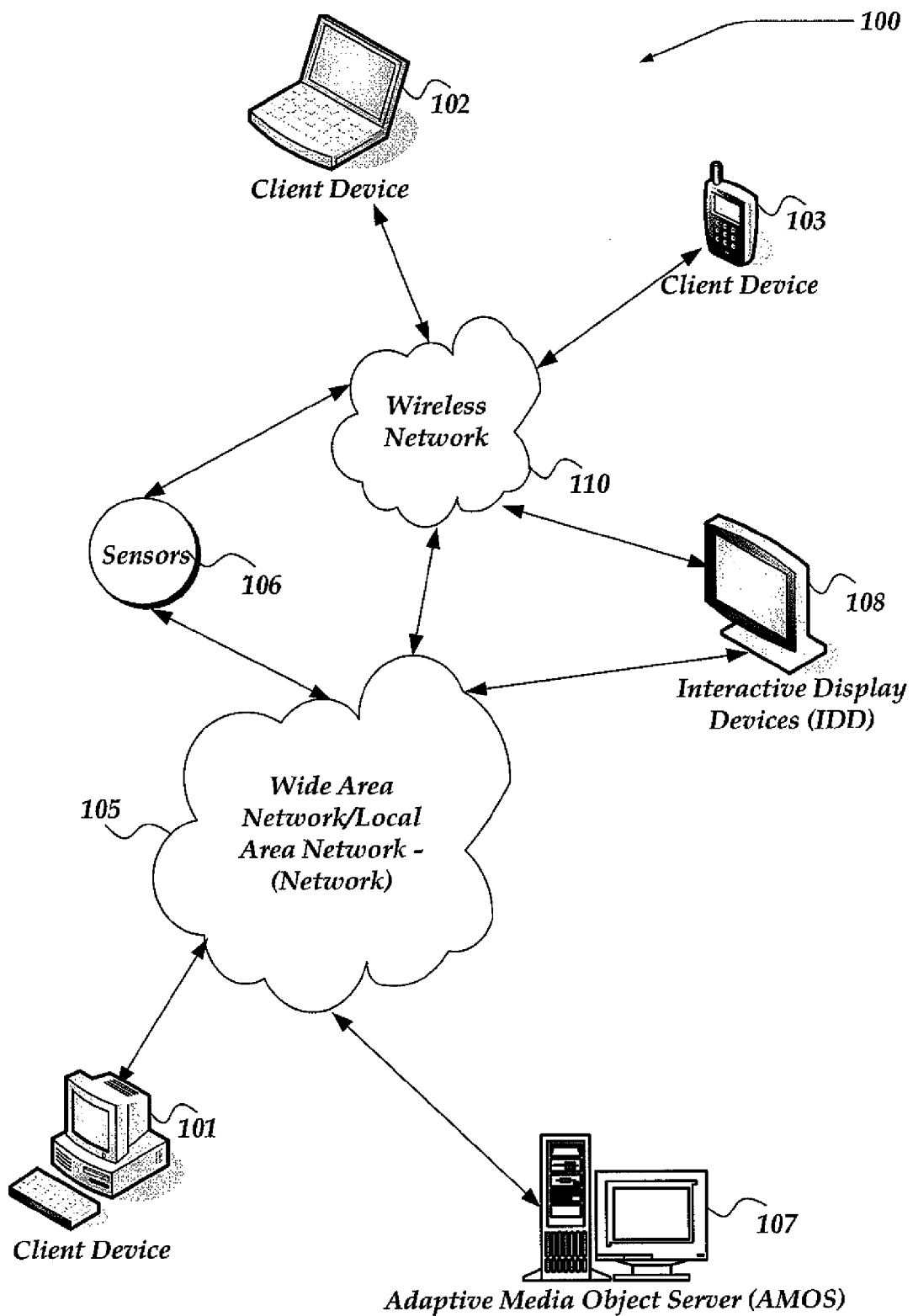
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise, The term "based on" is not exclusive and allows for being based on additional factors not described, unless the context clearly dictates otherwise. In addition, throughout the specification, the meaning of "a," "an," and "the" include plural references. The meaning of "in" includes "sin" and "on."

As used herein, the terms "social network" and "social commnunity" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user can communicate with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship, and so forth.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the present invention is directed towards managing an adaptive media object to dynamically represent a persona reflecting a group's or individual's online and/or offline status, activities, actions, intentions, and behaviors. The group or individual initially selects the adaptive media object to represent their digital persona. The adaptive media object may be an avatar or synthetic representation, a photograph of one or more members of the group or of an individual, an audio representation, video representation, or the like. The adaptive media object may be implemented using any of a variety of mechanisms, including, but not limited to Flash objects, Portable Network Graphics (PNG) files, Animated PNG (APNG) files, JavaScript, dynamic HTML, graphics interchange format (GIF) files, JPEG files, executable programs, scripts, applets, audio files, video files, or the like. It should be noted that implementation of an adaptive media object is not limited to these examples, and virtually any other mechanism may be used.

In one embodiment, the group or individual may indicate which activities, actions, and/or behaviors are to be used to adapt the persona represented by the adaptive media object. In one embodiment, the group or individual may further specify at least one mapping of a selected activity, action, and/or behavior to a change in the representation of the adaptive media object. In one embodiment, the various activities, actions, and/or behaviors may be input to a machine learning algorithm that dynamically determines the changes to the adaptive media object's configuration.

In one embodiment, the adaptive media object may serve as a single point of contact for the group or individual. That is, communications may be sent to the group, in one embodiment, by selecting the adaptive media object. The adaptive media object may then open a form, window, or other input mechanism useable to receive a user's inputs. In one embodiment, the input mechanism might be through Instant Messaging (IM), or other text messaging mechanism. However, the invention is not so limited, and virtually any communication mechanisms may be employed. For example, in one embodiment, the adaptive media object might change shape or form to receive and send messages. Thus, in one embodiment, the appearance of the adaptive media object may change to reflect the communications. Moreover, in one embodiment, the adaptive media object may be used as a spokesperson through which content can be transmitted to a non-member of the group/individual. In this manner, the group or individual may be able to interact with others without being personally identified as the source of communications. In one embodiment, one or more members of the group may be designated to act as a spokesperson for the group, to filter the response to the non-member, or the like.

In one embodiment, the adaptive media object may be configured and arranged to search for and/or manage communications with other adaptive media objects. For example, the adaptive media object may be configured to perform actions similar to, albeit different from, a network bot (robot), spider, or the like. However, the adaptive media object may communicate with other adaptive media objects, unlike traditional bots, spiders, or the like. For example, in one embodiment, the adaptive media object might interact with other adaptive media objects in the form of a game, competition, sharing of group information, including, membership information, goals of the group, or the like.

In one embodiment, the adaptive media object configuration may change based upon a context, such as the client device used to access the adaptive media object. For example, the presentation of the adaptive media object might be different on a mobile device than on television, personal computer, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes client devices 101-103, sensors 106, Interactive Display Devices (IDD) 108, and Adaptive Media Object Server (AMOS) 107, each of which are configured and arranged to communicate with each other using local area networks ("LANs")/wide area networks ("WANs")—(network) 105 and/or wireless network 110.

Generally, client devices 101-103 may include virtually any computing device capable of connecting to another computing device to send and receive information, including web requests for information from a server, providing content, or the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any network device, as illustrated, for example, by client device 103. Similarly, client devices 101-103 may be any device that is capable of connecting using a wired or wireless communication medium such as a PDA, POCKET PC, wearable computer, and any other device that is equipped to communicate over a wired and/or wireless communication medium, as illustrated for example, by client device 102. In one embodiment, client devices 102-103 may represent non-exhaustive examples of mobile devices One embodiment of a mobile device is described in more detail below in conjunction with FIG. 2B.

Client devices 101-103 may include a client application that may be configured to provide information that identifies itself, including a type, capability, name, and the like. Client devices 101-103 may identify themselves through any of a variety of mechanisms, including a phone number, Mobile Identification Number (MIN), an electronic serial number (ESN), or a network address, such as an Internet Protocol (IP)

address, or other device identifier. In one embodiment, client devices 101-103 may be configured to provide such device information and/or device identifier in a message, or the like, sent over network 105 to another computing device. In one embodiment, at least some information about the client device may also be provided to another computing device, through a network cookie.

Client devices 101-103 may further include a client application that is configured to manage various actions. For example, client devices 101-103 may include a web browser, or other application that is configured to enable a user to interact with other devices and/or applications over network 105. For example, client devices 101-103 may enable use of the web browser or other application to access content, web pages, adaptive media objects, or the like, from another computing device, such as AMOS 107, or the like.

In addition, client devices 101-103 may employ a variety of other client applications to communicate with other devices over network 105, including, but not limited to Voice Over Internet Protocol (VOIP), Instant Messaging (IM), Short Message Service (SMS), Multimedia Message Service (MMS), email, or the like. Thus, client devices 101-103 may employ a variety of mechanisms to establish communications with another computing device.

Client devices 101-103 may further be configured to include a client application that enables the user to log into a user account that may be managed by another computing device. Such user account, for example, may be configured to enable the user to receive and/or send email messages, SMS messages, audio messages, or the like. Such account may further be useable to enable the user to be identified as a member of a group, be identified with an adaptive media object, interact with other members of the group, or the like. However, in one embodiment, communications with another computing device may also be performed without logging into the user account.

In any event, a user may employ one of client devices 101-103 to perform a variety of online activities, actions, or the like, at least some of which may be useable to dynamically change, in real-time, a configuration of an adaptive media object for which the user is associated, to reflect changes in a collective persona of a group or individual.

Interactive Display Devices (IDD) 108 represent any of a variety of other networked devices that are configured and arranged to provide at least a display of an adaptive media object. Thus, IDD 108 may represent but is not limited to such items as televisions, kiosk systems, electronic billboards, or the like. In one embodiment, IDD 108 may also receive inputs, such as through a touch screen, audio input, keyboard inputs, or the like, that may be used to provide input to the group or individual through the adaptive media object. IDD 108 may be placed in a variety of locations, including, but not limited to public buildings, on moving vehicles, street corners, or the like. As such, IDD 108 may employ wired and or wireless communications over network 105 and/or wireless network 110.

Sensors 106 represent virtually any device that may be configured and arranged to detect various actions, behaviors, activities, or the like, and to provide information about such detections to AMOS 107 for use in dynamically changing the configuration of an adaptive media object. In one embodiment, sensors 106 might represent a motion sensor, a global positioning system (GPS) tracking device, a sound or video input device, a device sensing another person, a device sensing time (e.g., minute, hour, season, day/night), or even a sensor able to detect environmental changes (e.g., weather, inside/outside, altitude). In one embodiment, sensors 106 might be a device that may be attached to a cup to detect an amount of liquid within the cup. Sensors 106 might then be used to provide information about an amount of coffee consumed by a user over a given time. Similarly, sensors 106 might include a GPS tracking device that enables detection of changes in location of a user. Thus, sensors 106 may be employed by members of a group, or individuals, to automatically detect various actions, behaviors, or activities of the member or individual, and to send such information to AMOS 107 for use in changing the configuration of an adaptive media object.

Sensors 106 are not constrained to receiving input signals however. In one embodiment, sensors 106 may be configured and arranged to provide an output signal. Thus, as an example, sensors 106 may be arranged to cause a coffee cup to vibrate, a toy doll, action figure, or the like, to stand up/sit down or otherwise perform motions, make sounds, or the like, based on a change in the persona of the group or individual. Thus, sensors 106 might be configured to enable a real world object to perform various actions, sounds, or the like, based on sensing activities, or the like, from one or more members of the group or the individual and reflecting such activities in actions, sounds, or the like into the real world object. Thus, it should be clear that sensors 106 may employ wired and/or wireless communications over network 105 and/or wireless network 110.

While sensors 106 are illustrated as distinct from client devices 101-103, the invention is not so limited. For example, sensors 106 may be integrated within or attached thereon to one of client devices 101-103, without departing from the scope of the invention.

Wireless network 110 is configured to couple client devices 102-103, and/or sensors 106, and/or IDD 108, with network 105. Wireless network 110 may include any of a variety of wireless sub-networks that may further overlay stand-alone ad-hoc networks, or the like, to provide an infrastructure-oriented connection for client devices 102-103, or other mobile devices. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple one computing device with another computing device to enable them to communicate information. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, fall or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between one computing device and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of a network device configured to operate as AMOS 107 is described in more detail below in conjunction with FIG. 2A. Briefly, however, AMOS 107 may be configured to operate as network server to manage and provide access to an adaptive media object. AMOS 107 may operate as a web server, a messaging server, a File Transfer Protocol (FTP) server, a database server, a content server, a blog site, a social networking site, or the like.

AMOS 107 may receive information about those to be represented by the adaptive media object, including device identifiers, sensor identifiers, user names, aliases, account identifiers, or the like. AMOS 107 may further collect selected behaviors, actions, and/or activities of the represented group and/or individual for use in determining a change in a configuration of the adaptive media object.

AMOS 107 may receive a request for access of the adaptive media object, and further modify the configuration of the adaptive media object based on a contextual characteristic of the requesting device, network connections, or the like. In one embodiment, AMOS 107 may employ processes such as described below in conjunction with FIGS. 3-5 to perform at least some of its actions.

Devices that may operate as AMOS 107 include personal computers desktop computers, multiprocessor systems, microprocessor-based or programmable consumer electronics, network PCs, servers, and the like.

Although a single network device is illustrated for AMOS 107, the invention is not so limited. Thus, in another embodiment, a plurality of network devices may be used to manage and/or provide access to an adaptive media object.

Illustrative Adaptive Media Object Network Device

Figure 2A:
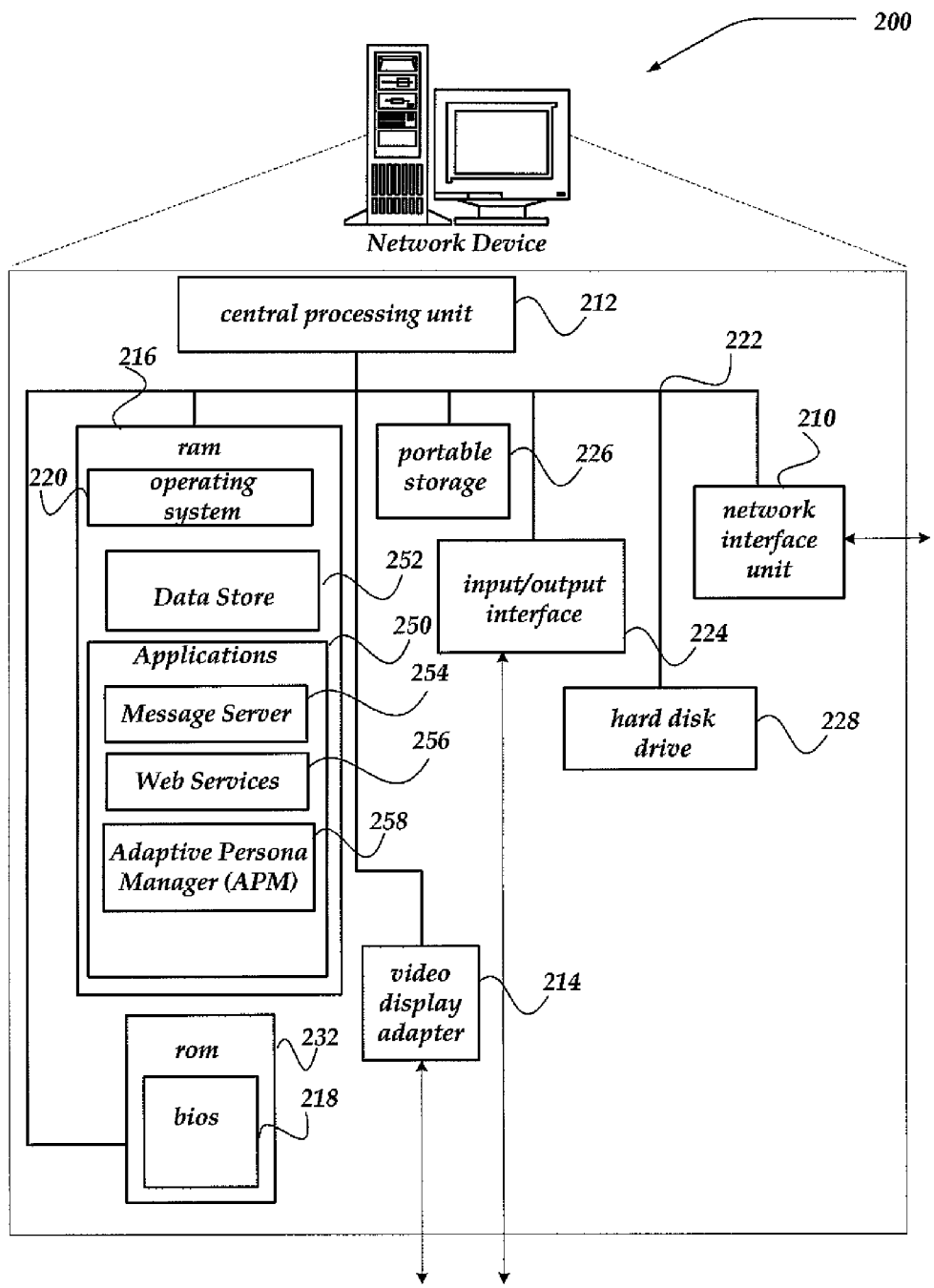
FIG. 2A shows one embodiment of a network device that may be included in a system implementing the invention.

FIG. 2A shows one embodiment of a network device, according to one embodiment of the invention. Network device 200 may include many more components than those shown. The components shown, however, are sufficient to disclose an illustrative embodiment for practicing the invention. Network device 200 may represent, for example, AMOS 107 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2A, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, HTTP programs, encryption programs, security programs, VPN programs, account management, and so forth. Mass memory also includes data store 252. Applications 250 also include message server 254, web services 256, and Adaptive Persona Manager (APM) 258.

Data store 252 is configured and arranged to manage storage for a variety of data, including, but not limited to identifiers associating a member to a group, adaptive media objects, or the like; information indicating types of activities, messages, behaviors, and/or actions to monitor; mapping information; possible configurations for changes in the adaptive media objects; data for use by a learning machine algorithm; weighting factors; filters; adaptive media objects; and the like. Data store 252 may be implemented as a folder, database, program, or the like. Moreover, although data store 252 is illustrated within ram 216, the invention is not so limited. For example, one or more portions of data store 252 may also reside, or reside instead, in one or more of portable storage 226, hard disk drive 228, or the like.

Message server 254 may include virtually any computing component or components configured and arranged to forward messages from a message user agent, and/or other message server, and/or to deliver messages to a local message store, such as data store 252, or the like. Thus, message server 254 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 254 is not constrained to email messages, and other messaging protocols may also be managed by one or more components of message server 254. Thus, message server 254 may also be configured to manage SMS messages, IM, MMS, IRC, mIRC, or any of a variety of other message types.

Web services 256 are configured to manage requests from a client device's application (such as a browser) and deliver web-based content in response. As such, web services 352 may include such applications as Apache, Internet Information Server (IIS), Netscape, National Center for Supercomputing Applications (NCSA), or the like. In one embodiment, web services 352 communicate with the client's browser application employing HTTP. However, web services may as database searching, e-commerce, and the like, as well as providing applets, java-scripts, or the like, for use by the client's browser application.

Web services 256 may enable a user of client devices to access and/or otherwise interact with an adaptive media object. For example, in one embodiment, web services 256 may be configured and arranged to display the adaptive media object within a web page, or the like. Where the adaptive media object includes audio clips, video clips, or other types of content streaming media, and/or combinations thereof, web services 256 may provide an interface for the user to access and/or interact with the adaptive media object.

In one embodiment, web services 256 may enable the adaptive media object to interact with message server 254 to enable an interchange of messages. In one embodiment, web services 256 may enable messages that are sent and/or received through an adaptive media object to be accessed through a client's browser. However, web services 256 is not constrained to merely enabling the adaptive media object to communicate with a user though message server 254, and virtually any other mechanism may be employed, including, but not limited to the adaptive media object being configured and arranged to include a component for communicating directly with a user, another adaptive media object, or the like.

APM 258 is configured and arranged to manage adaptive media objects. In one embodiment, APM 258 may be embodied within an adaptive media object. In another embodiment, APM 258 may operate on adaptive media objects, in part, by providing changes in configurations of and providing access to an adaptive media object such that the adaptive media object dynamically reflects in real-time a persona of a group and/or individual.

As noted above, an adaptive media object may be implemented using any of a variety of mechanisms. For example, adaptive media objects may be implemented using Flash objects, Portable Network Graphics (PNG) files, Animated PNG (APNG) files, JavaScript, dynamic HTML, graphics interchange format (GIF) files, JPEG files, executable programs, scripts, applets, or the like. It should also be noted that an adaptive media object may also be implemented as a video, audio clip, or the like. Thus, adaptive media objects may also use MPEG formats, WAV formats, AVI formats, or the like, without departing from the scope of the invention.

APM 258 may be configured to enable one or more members or individuals to identify themselves; identify a source useable to obtain information about actions, behaviors, and/or activities; and to select an adaptive media object. APM 258 further enables one or more members of a group or individuals to define one or more configurations of the adaptive media object to represent a change in the persona of the group and/or individual. The member(s) and/or individual may further employ APM 258 to indicate a mapping between the configurations and actions, behaviors, and/or activities. In one embodiment, APM 258 further allows member(s) and/or an individual to determine a filter for filtering or excluding selected actions, behaviors, and/or activities; and/or weights to be applied to one or more actions, behaviors, and/or activities.

APM 258 may also enable member(s) and/or an individual to receive from and/or send communications to others through an adaptive media object. As such, in one embodiment, APM 258 may interact with web services 256, message server 254, or the like, to enable an adaptive media object to provide an interface useable to communicate with others, including other adaptive media objects. Such interface may take a variety of forms, including, but not limited to a form field for text entry/display; a sound file; an audio input interface, a text input/display interface, or the like.

APM 258 may further enable the adaptive media object to operate as a spider, network bot, or the like, to search for and/or communicate with other adaptive media objects. APM 258 may also receive, through web services 256 a request for access to an adaptive media object. In one embodiment, web services 256, or another application, may provide APM 258 with characteristics of the requesting device, including but not limited to a device type, network carrier, device capabilities, associated device applications, or the like. APM 258 may then use such contextual characteristics to dynamically modify the configuration of the adaptive media object for access by the requesting device, where such changes in configuration may include more than or other than merely a size change, a resolution change, or the like, of the adaptive media object. In one embodiment, APM 258 may employ processes such as described below in conjunction with FIGS. 3-5 to perform at least some of its actions.

Illustrative Mobile Device Environment

Figure 2B:
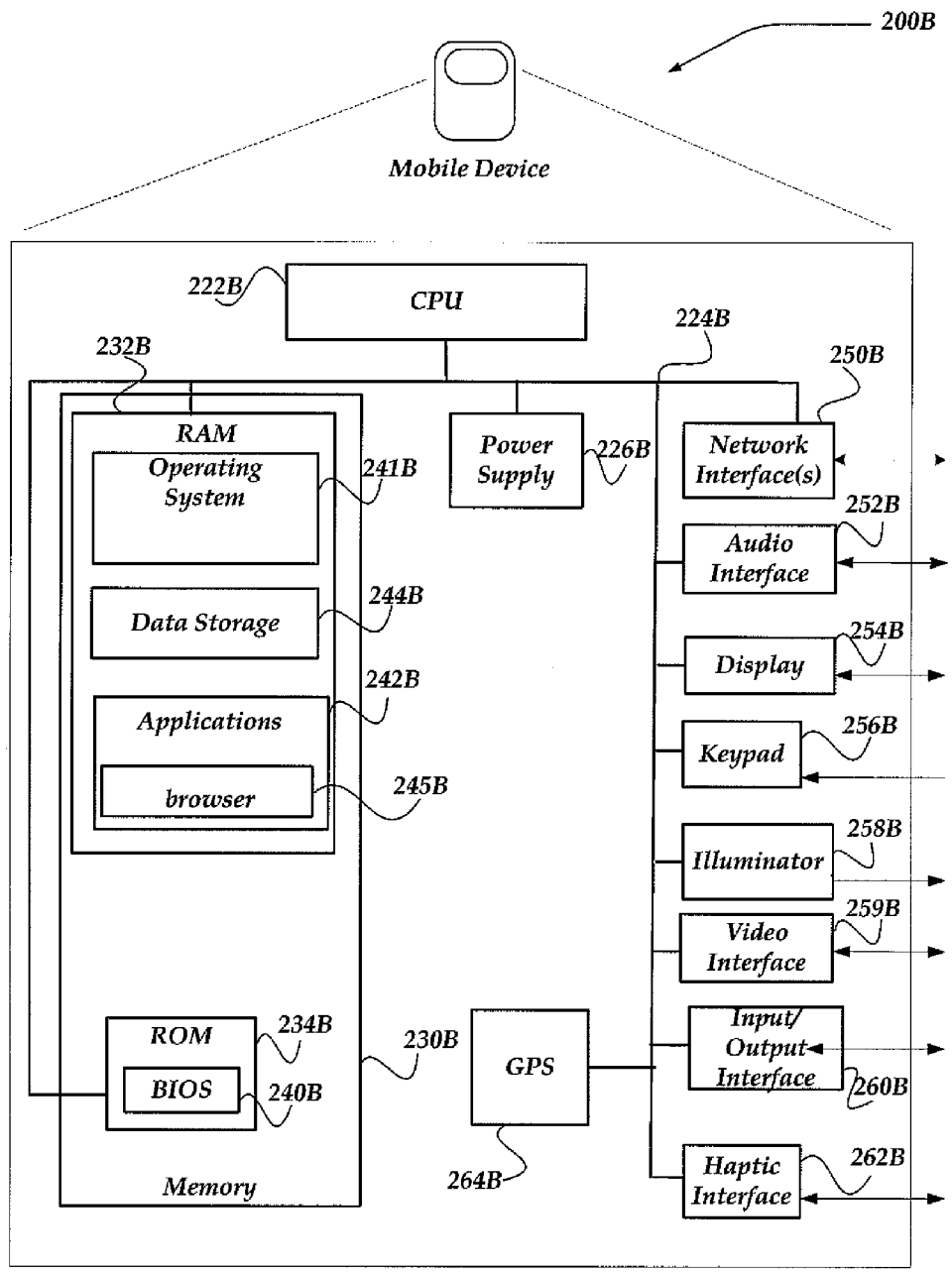
FIG. 2B shows one embodiment of a mobile device that may be included in a system implementing the invention

FIG. 2B shows one embodiment of mobile device 200B that may be included in a system implementing the invention. Mobile device 200B may include many more or less components than those shown in FIG. 2B. However, the components shown are sufficient to disclose an illustrative embodiment for practicing the present invention. Mobile device 200B may represent, for example, client devices 102-103 of FIG. 1.

As shown in the figure, mobile device 200B includes a processing unit (CPU) 222B in communication with a mass memory 230B via a bus 224B. Mobile device 200B also includes a power supply 226B, one or more network interfaces 250B, an audio interface 252B, video interface 259B, a display 254B, a keypad 256B, an illuminator 258B, an input/output interface 260B, a haptic interface 262B, and an optional global positioning systems (GPS) receiver 264B. Power supply 226B provides power to mobile device 200B. A rechargeable or non-rechargeable battery may be used to provide power. The power may also be provided by an external power source, such as an AC adapter or a powered docking cradle that supplements and/or recharges a battery.

Mobile device 200B may optionally communicate with a base station (not shown), or directly with another computing device. Network interface 250B includes circuitry for coupling mobile device 200B to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/internet protocol (TCP/IP), SMS, general packet radio service (GPRS), WAP, ultra wide band (UVVB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250B is sometimes known as a transceiver, transceiving device, or network interface card (NIC).

Audio interface 252B is arranged to produce and receive audio signals such as the sound of a human voice. For example, audio interface 252B may be coupled to a speaker and microphone (not shown) to enable telecommunication with others and/or generate an audio acknowledgement for some action. Display 254B may be a liquid crystal display (LCD), gas plasma, light emitting diode (LED), or any other type of display used with a computing device. Display 254B may also include a touch sensitive screen arranged to receive input from an object such as a stylus or a digit from a human hand.

Video interface 259B is arranged to capture video images, such as a still photo, a video segment, an infrared video, or the like. For example, video interface 259B may be coupled to a digital video camera, a web-camera, or the like. Video interface 259B may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256B may comprise any input device arranged to receive input from a user. For example, keypad 256B may include a push button numeric dial, or a keyboard. Keypad 256B may also include command buttons that are associated with selecting and sending images. Illuminator 258B may provide a status indication and/or provide light. Illuminator 258B may remain active for specific periods of time or in response to events. For example, when illuminator 258B is active, it may backlight the buttons on keypad 256B and stay on while the client device is powered. Also, illuminator 258B may backlight these buttons in various patterns when particular actions are performed, such as dialing another client device. Illuminator 258B may also cause light sources positioned within a transparent or translucent case of the client device to illuminate in response to actions.

Mobile device 200B also comprises input/output interface 260B for communicating with external devices, such as a headset, or other input or output devices not shown in FIG. 2B. Input/output interface 260B can utilize one or more communication technologies, such as USB, infrared, Bluetooth™, Wi-Fi, Zigbee, or the like. Haptic interface 262B is arranged to provide tactile feedback to a user of the client device. For example, the haptic interface may be employed to vibrate mobile device 200B in a particular way when another user of a computing device is calling.

Optional GPS transceiver 264B can determine the physical coordinates of mobile device 200B on the surface of the Earth, which typically outputs a location as latitude and longitude values. GPS transceiver 264B can also employ other geo-positioning mechanisms, including, but not limited to, triangulation, assisted GPS (AGPS), E-OTD, CI, SAI, ETA, BSS or the like, to further determine the physical location of mobile device 200B on the surface of the Earth. It is understood that under different conditions, GPS transceiver 264B can determine a physical location within millimeters for mobile device 200B; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230B includes a RAM 232B, a ROM 234B, and other storage means. Mass memory 230B illustrates another example of computer storage media for storage of information such as computer readable instructions, data structures, program modules or other data. Mass memory 230B stores a basic input/output system ("BIOS") 240B for controlling low-level operation of mobile device 200B. The mass memory also stores an operating system 241B for controlling the operation of mobile device 200B. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230B further includes one or more data storage 244B, which can be utilized by mobile device 200B to store, among other things, applications 242B and/or other data. For example, data storage 244B may also be employed to store information that describes various capabilities of mobile device 200B. The information may then be provided to another device based on any of a variety of events, including being sent as part of a header during a communication, sent upon request, or the like. Moreover, data storage 244B may also be employed to store personal information including but not limited to address lists, contact lists, personal preferences, or the like. Data storage 244B may also include some profile information. At least a portion of the information may also be stored on a disk drive or other storage medium (not shown) within mobile device 200B.

Applications 242B may include computer executable instructions which, when executed by mobile device 200B, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242B may also include browser 245B. In one embodiment, browser 245B may be a browser application. In another embodiment, browser 245B may be a browser application with a downloadable plug-in, script, applet, or the like, that is configured and arranged to manage messages, provide displays of adaptive media objects, receive various inputs, or the like.

In one embodiment, browser 245B may include a browser application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

Browser 245B is not limited to browser applications, however. Thus, in another embodiment, browser 245B may further be configured as a messenger application that is configured to send, to receive, and/or to otherwise process messages using SMS, MMS, IM, email, VOIP, and/or any of a variety of other messaging communication protocols. Although a single browser 245B is illustrated it should be clear that multiple applications may be employed. For example, one browser 245l3 may be configured to manage SMS messages, where another application may manage IM messages, and yet another messaging client is configured to manage emails, or the like, with one or more of such applications being able to manage messages using interest clusters and/or hop distances.

Generalized Operation

Figure 5:
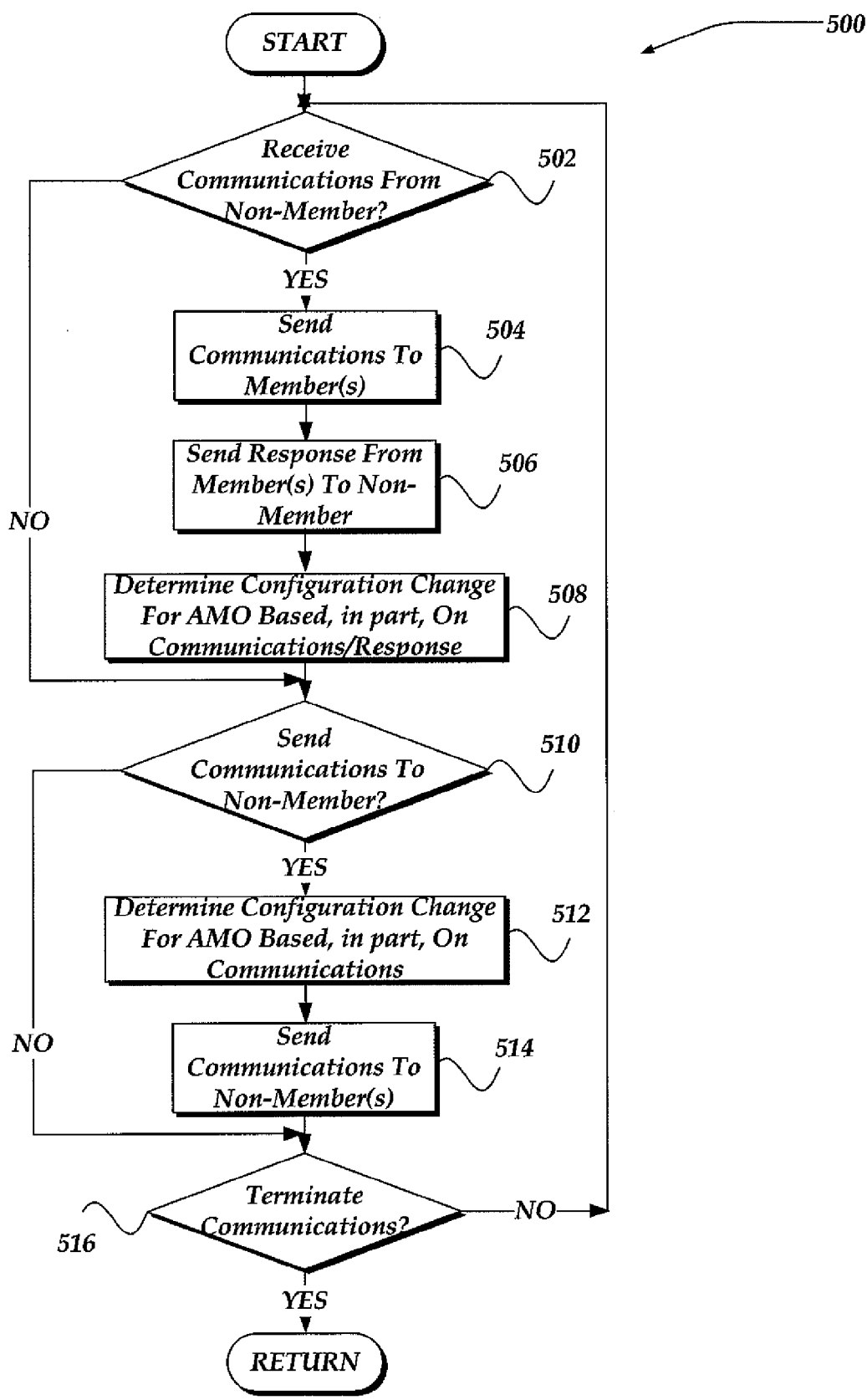
FIG. 5 illustrates a logical flow diagram generally showing one embodiment of a process for managing communications with non-members using the adaptive media object.
Figure 6:
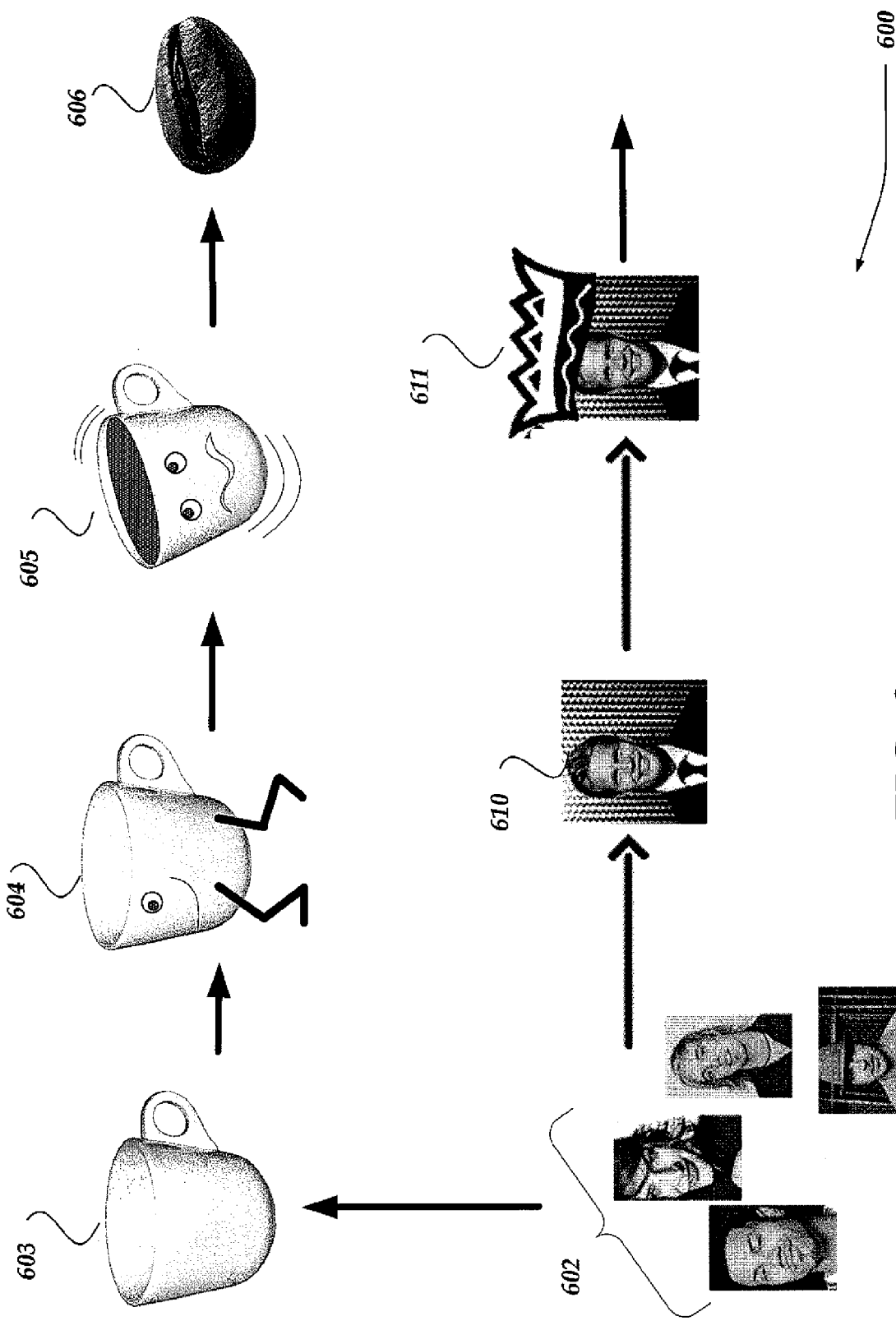
FIG. 6 shows one embodiment of changes in configurations of adaptive media objects.

The operation of certain aspects of the invention will now be described with respect to FIGS. 4-6, where FIG. 6 provides examples of adaptive media objects.

Figure 3:
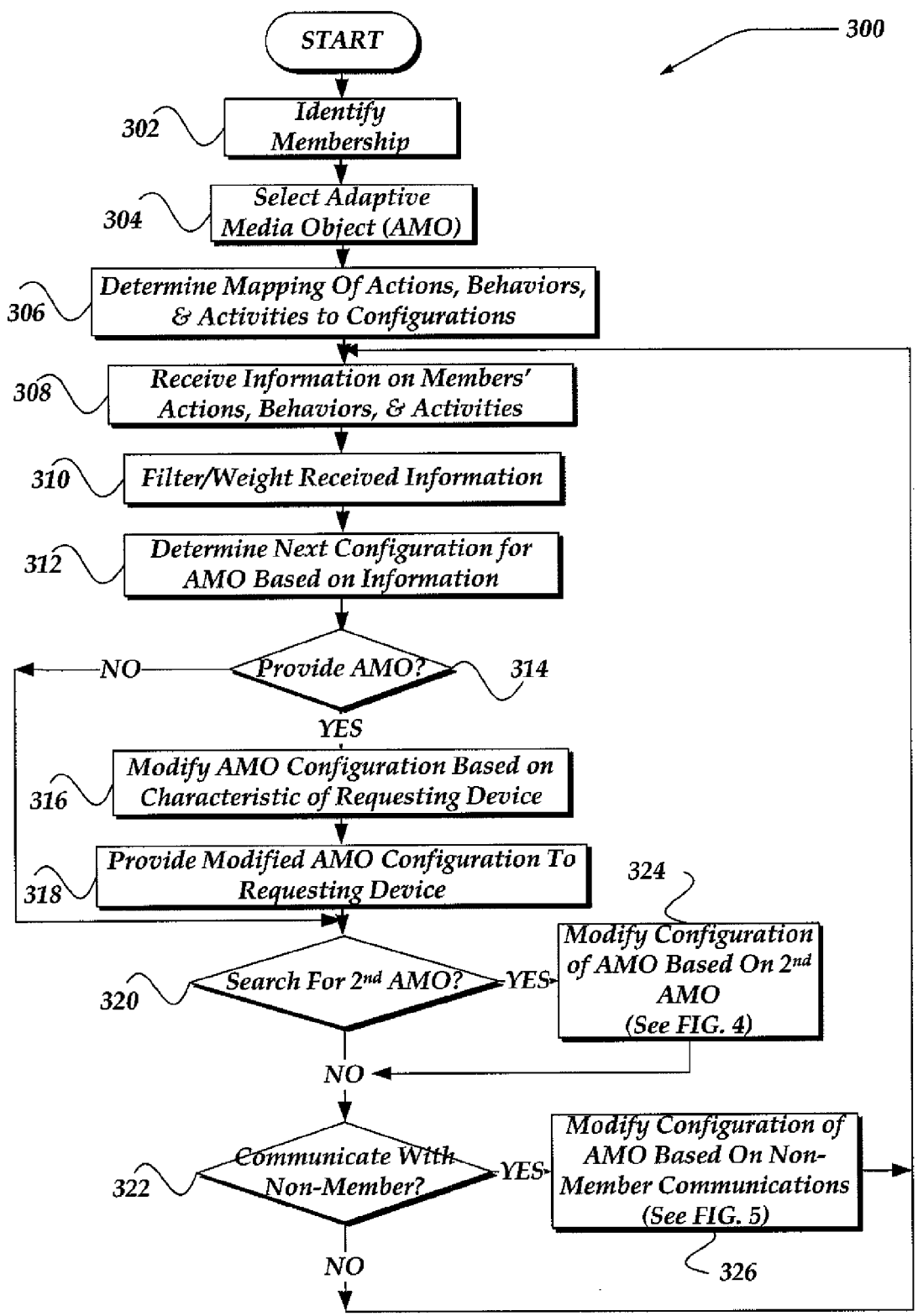
FIG. 3 illustrates a logical flow diagram generally showing one embodiment of a process for managing an adaptive media object to dynamically represent a persona of an online group or individual.

FIG. 3 illustrates a logical flow diagram generally showing one embodiment of a process for managing an adaptive media object to dynamically represent a persona of an online group or individual. It should be noted that while process 300 of FIG. 3 implies a sequential flow of actions, the invention is not so limited. Thus, it should be apparent that at least some actions described below may be performed concurrent with other actions, or even in a different order than illustrated. Therefore, various other embodiments of the invention are not limited or otherwise constrained to sequential flow illustrated in FIGS. 3-5. Moreover, in one embodiment, process 300 may be implemented within AMOS 107 of FIG. 1.

As illustrated, process 300 begins, after a start block, at block 302, where membership is identified. As noted above, an adaptive media object may represent a group of persons, a subset of a group, an individual, or virtually any other form of organizational structure. As used herein, the term person includes businesses, institutions, corporations, and organizations, as well as individuals. Identification of the membership may include members providing a device identifier, a user name, alias, account identifier, information about sensors, or the like.

Processing flows next to block 304, where one or more members select the adaptive media object that is to be used to actively represent the who, what, when, where, and how of the group. That is, the adaptive media object may be selected to reflect a dynamically changing persona of the group and/or individual based on its actions, behaviors, and activities, or the like.

The selection of the adaptive media object may be configured to embody core attributes including, but not limited to role, identity, number of participants, visual representation, and/or audio representation. The role attribute is directed towards denoting a point of view of the persona reflected by the adaptive media object. The role may represent a characteristic, belief, theme, or the like, of the group or individual being represented. For example, a group of coffee enthusiasts might be those represented by the adaptive media object of a coffee cup as the group's representative.

Identity refers to whether the adaptive media object represents a 'real' human or a 'synthetic' created entity. The number of participants indicates a scale of membership involved, while representation identifies how the adaptive media object is presented. Presentation may include, as noted above, a physical world or realistic representation, such as a photograph, video, sound, or the like, while an avatar may suggest an interpretation of what the group and/or individual represents. Real world representations may take a variety of forms, including a photograph of an individual or one or more members of the group, a video collage of an individual or one or more members, and/or a soundtrack of sounds associated with an individual or one or more members of the group.

However, the identity is not limited to these real world representations. For example, actual physical real world representations may be employed. For example, coffee cups, action figures, dolls, pens, or the like, might be provided that are configured with sensors, or other mechanisms to receive and display changes, provide sounds, or the like, based on changes in the persona of the group or individual.

One or more of these attributes may be combined and used to select the adaptive media object. For example, a group of real people, such as coffee enthusiasts, could be represented by:

a physical world (e.g., photographic) representation of an individual or members of the group, such as in a team photo, and/or A physical world (e.g., photographic) representation of an individual or one of the members of the group operating as a spokesperson photo, and/or An avatar (e.g., a graphical) representation of an individual or the members of the group, such as in a graphical representation of a set of different coffee cups, and/or An avatar (e.g., a graphical) representation of an individual or one member of the group, or a single graphical representing a spokesperson to the group, such as a single coffee cup.

It should be noted that the above are mere examples, and other attribute combinations may also be used to select the adaptive media object for the group. Moreover, it should be further noted that the group or individual is not precluded from selecting multiple adaptive media objects. For example, in one embodiment, the group might use one adaptive media object as a spokesperson persona, while another adaptive media object might be used to represent collective activities of the group, different sub-groups, or the like.

In any event, process 300 continues to block 306, where a mapping of actions, behaviors, and/or activities to configurations of the adaptive media object may be determined. As the adaptive media object has the flexibility to represent individual activity within a group as well as to aggregate the activity of members within the group, various actions, behaviors, and/or activities may be identified as those the group desires to have included in affecting the persona to be reflected by the adaptive media object. In one embodiment, one or more members may identify the actions, behaviors, and/or activities and how they might be mapped to a change in the configuration of the adaptive media object. In one embodiment, determining such mapping might include determining how to weight information received about such actions, behaviors, and/or activities. For example, it might be determined that selected actions, behaviors, and/or activities might be more desirable to show in the persona, than other actions, behaviors, and/or activities. Thus, the desirable actions, behaviors, and/or activities might have a higher weighting than other actions, behaviors, and/or activities. The mapping might further include selection of a desirable configuration change to the persona based on the actions, behaviors, and/or activities.

For example, in the coffee enthusiasts example, actions, behaviors, and/or activities might include information about how much coffee is consumed collectively by the group's members over a given time, and information about any online activities by the members related to how much coffee is consumed, where it is consumed, quality of the coffee, or simply how many postings of any coffee related communications are detected over a given time. The information about these example actions, behaviors, and/or activities may then be mapped to different configurations of a coffee cup avatar by, for example, a jittery animation of the coffee cup indicating a total amount of coffee consumed: the more coffee consumed, the more jittery the animation. Similarly, the number of postings by the members may be mapped to an amount of text coming forth from the coffee cup, a speed of an audio clip from the coffee cup, or the like. It should be noted, that these examples are merely illustrative and are not intended to be exhaustive or to otherwise narrow the invention.

While one embodiment of the adaptive media object enables the members to define the mapping between actions, behaviors, and/or activities and a change in configuration of the adaptive media object, the invention is not so limited. For example, in other embodiments, a machine learning algorithm might be employed that may dynamically learn various configurations for use in dynamically changing the adaptive media object in real-time. Thus, a machine learning algorithm might create a next configuration based on various combinations of actions, behaviors, and/or activities and a current configuration. Thus, the appearance of the adaptive media object might change not only based on actions, behaviors, and/or activities currently received, but also on its current configuration. However, other implementations of machine learning algorithms may also be employed to vary the configuration of the adaptive media object to reflect the persona of the group or individual.

In any event, processing proceeds to block 308, where information about various actions, behaviors, and/or activities of one or more members of the group or the individual is received. As noted above, such information may be received based on online activities, or even offline activities, such as from various sensors, client devices, or the like.

Processing continues to block 310, where the information may be filtered to obtain those actions, behaviors, and/or activities that were identified at block 306. In one embodiment, the filtering may be configured to filter out selected actions, behaviors, and/or activities that the members wish to have hidden from non-members. For example, where the members may be disjointed due to a heated discussion over elections of officers, or the like, the members may select to have such behaviors filtered out by filtering out messages related to such behaviors, or the like. Moreover, the filtered information may be weighted to reflect a majority of the members, a selected sub-set of the members, or based on any of a variety of other criteria.

Continuing to block 312, the next configuration of the adaptive media object is determined based on the mapping (and/or machine learning algorithm) and the information obtained from block 310. In one embodiment, the change in configuration may immediately be reflected in the change in the adaptive media object available to the members and/or non-members.

However, in one embodiment, the configuration of the adaptive media object may be further modified based on a context in which the adaptive media object is provided. Thus, processing may flow to decision block 314, where a determination is made whether to provide access to the adaptive media object. If not, then processing branches to decision block 320. Otherwise, processing flows to block 316, where the configuration may be further modified based on a context in which the adaptive media object is to be accessed. For example, in one embodiment, a mobile client device might request access to the adaptive media object. The requesting device might have certain constraints on how it can access, display, or otherwise provide the adaptive media object to a user of the mobile client device. For example, mobile device might have a slower network connection than say a personal computer, television, or the like. As such, reflecting coffee consumption using jittering of the coffee cup might not properly show changes in a rate of jitter, due to the slow network connection. Thus, in the instance example, instead of "jittering" the coffee cup, the configuration might be modified based on the slow network connection speed, to be a fatter sized coffee cup to reflect the amount of coffee consumed. Thus, it should be clear that modifications to the configuration include more than merely changing a size or resolution of the adaptive media object, but may include other configuration changes.

Network connection is but one example of possible context characteristics that may be used to modify the configuration of the adaptive media object, and others may also be used. Thus, at block 316, characteristics of the requesting device, including but not limited to type of device, a network carrier used, a display constraint, applications hosted by the device, or the like, may also be used. Process 300 then flows to block 318, where the changes in the configuration of the adaptive media object are then used to provide the adaptive media object to a computing device. Processing proceeds flows to decision block 320.

It is apparent from above that adaptive media objects may evolve over time based on actions, behaviors, and/or activities and even location of members of the group and/or individual. This may be reflected positively, or negatively. A more active and engaged group and/or individual however, may result in a more vibrant and active adaptive media object than that of a group and/or individual who does not actively participate in activities or the like, reflected in their persona. To this end, therefore, in one embodiment, adaptive media objects may interact with each other. Thus, at decision block 320, a determination is made whether to search for and communicate with another (second) adaptive media object. As noted above, the adaptive media object may be configured to find other adaptive media objects over the network based on a variety of criteria. In one embodiment, whether to search for other adaptive media objects may be based on input from one or more members of the group, an occurrence of an event, a timed event, a learned condition, or the like. If it is determined that the adaptive media object is to search for and communicate with another adaptive media object, processing flows to block 324; otherwise, processing moves to decision block 322. Block 324 is described in more detail below in conjunction with FIG. 4. Briefly, however, at block 324, the configuration of the adaptive media object may dynamically change in real-time based on communications with another adaptive media object.

After, or even concurrent with block 324, processing flows to decision block 322, where a determination is made whether the adaptive media object is to communicate with a non-member. If not, then processing may loop back to block 308; otherwise, processing flows to block 326 which is described in more detail below in conjunction with FIG. 5. Briefly, however, at block 326, the configuration of the adaptive media object may dynamically change in real-time based on communications with the non-member. Processing then may branch back to block 308 to continue to enable dynamic real-time changes in the configuration of the adaptive media object to reflect the persona of the represented members and/or individual.

Figure 4:
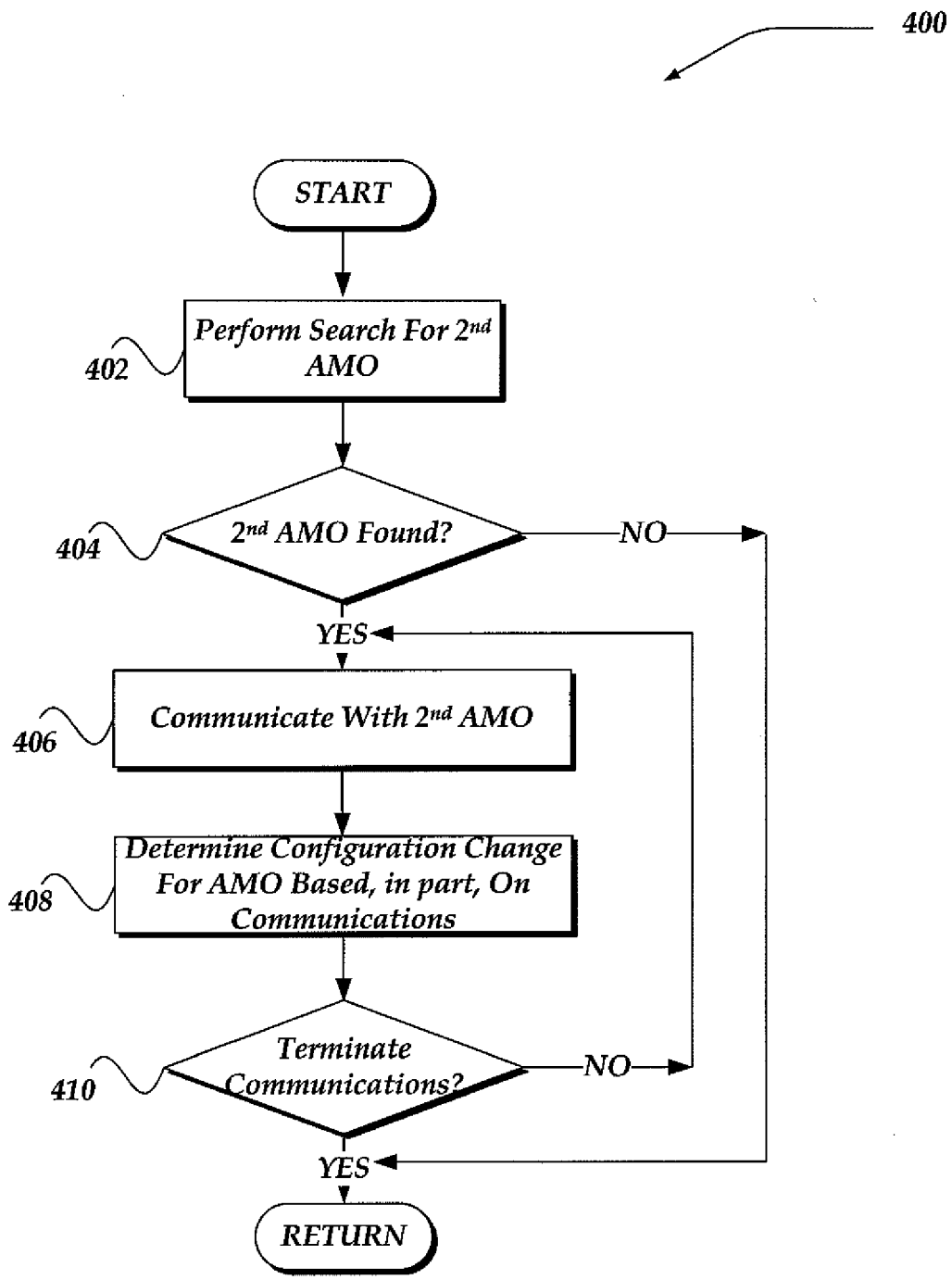
FIG. 4 illustrates a logical flow diagram generally showing one embodiment of a process for managing communications between adaptive media objects.

FIG. 4 illustrates a logical flow diagram generally showing one embodiment of a process for managing communications between adaptive media objects. Process 400 of FIG. 4 may represent block 324 of FIG. 3.

Process 400 begins, after a start block, where a search is performed for a second (or more) adaptive media objects. As noted above, the search may be based on a variety of criteria, including searching for adaptive media objects that might reflect similar group roles, themes, ideals, or the like. Moreover, the search may be performed by the adaptive media object, or initiated through the adaptive media object. In addition, the search might be initiated based on actions, behaviors, and/or activities of a member or members, or may be initiated based on variety of criteria, events, or the like. Processing flows next to decision block 404, where a determination is made whether another adaptive media object is detected that satisfies the search criteria. If at least one is not found, processing may return to a calling process to perform other actions; otherwise, processing continues to block 406.

At block 406, communications with the second adaptive media object may occur. In one embodiment, the communication may result in a sharing of information about the represented groups and/or individuals. In another embodiment, the communications may take the form of a competition, game, or the like, in which instance the communication may represent participation in the competition, game, or the like.

Process 400 flows next to block 408, where a change in the configuration of the adaptive media object may dynamically be determined in real-time based on the communications with the other adaptive media object. Processing then flows to decision block 410 to determine whether to terminate the communications. If so, processing returns to a calling process to perform other actions; otherwise, processing loops back to block 406.

It should be noted that communications between adaptive media objects may include communications between more than two adaptive media objects, enabling groups to reach out and communicate with others. Moreover, it should be clear that although not illustrated in process 400, the adaptive media object may receive a request to communicate from another adaptive media object that initiates the communications.

FIG. 5 illustrates a logical flow diagram generally showing one embodiment of a process for managing communications with non-members using the adaptive media object. Process 500 of FIG. 5 may represent block 326 of process 300, in one embodiment.

Process 500 begins, after a start block, at decision block 502, where a determination is made whether a communication is received from a non-member. As noted above, an adaptive media object may be configured and arranged to operate as a point of contact for a group and/or individual. As such, non-members (and even members) may communicate with the group through the adaptive media object using a variety of mechanisms, including, but not limited to selecting the adaptive media object, sending messages to an identifier associated with the adaptive media object, or the like. In any event, if a communication is received, processing flows to block 504; otherwise, processing branches to decision block 510.

At block 504, in one embodiment, the communications may be sent to one or more members to enable coordination of communications with the non-member. In one embodiment, the communications from the non-member might be analyzed by the adaptive media object, or another component to determine how to respond, and/or where to send the received communications.

Proceeding to block 506, a response from the member(s) may be sent to the non-member. Concurrent with such communications, block 508 may be performed where a change in configuration for the adaptive media object is determined and provided to at least the non-member based on the communications. It should be understood that such communications and real-time changes in the adaptive media object's configuration may be iterative, until either the non-member and/or the adaptive media object terminates the communication.

Processing then flows to decision block 510, where a determination is made whether the adaptive media object is to communicate with non-members. Such flow might arise, for example, where the member or members wish to provide information to non-members, or even other members, other adaptive media objects, or the like. Thus, if a communication is to be initiated by the adaptive media object, processing flows to block 512; otherwise, processing flows to decision block 516.

At block 512, a change in configuration of the adaptive media object is determined and provided to at least the non-member (or member) based on the communications. Moreover, the adaptive media object may initiate the communication at block 514 using any of a variety of mechanisms, including, emails, text messaging, alerts, RSS feeds, or the like.

Processing flows next to decision block 516, where a determination is made whether to terminate communications, and if so, processing returns to a calling process to perform other actions. Otherwise, processing may loop back to decision block 502. It should be noted, that while the flow of process 500 indicates a sequential process of receiving communications from a non-member, then initiating communications with a non-member, other embodiments are not so limited. Thus, one or more of blocks 502 through 508 may be performed concurrent with or even subsequent to one or more of blocks 510 through 514. Moreover, while the above is described in terms of a communication with a non-member, the process may also enable members of the group to communicate with the group through the adaptive media object.

As described above, the member or members may utilize the adaptive media object as a spokesperson for the member or members. Content may be created by the member(s) and transmitted through the adaptive media object to an audience and vice versa. As such, the member(s) may interact with others without having to be identified as a source of the communication. The network of persons and data enabling the adaptive media object may be large or very small. However, to a non-member or even a member, it may appear as if the content, activity, behavior, or the like of the adaptive media object reflects a singular persona. Moreover, the member(s) can coordinate their communication efforts by using the adaptive media object as a spokesperson representing a single focused response of an individual or a collective wisdom of a large group.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative

FIG. 6 shows one embodiment of screen shots of changes in configurations of an adaptive media object to dynamically reflect in real-time a persona of one or more individuals, members of a group, or the like. It should be understood that FIG. 6 is not intended to be exhaustive or otherwise to constrain or narrow the scope of the invention. Its purpose is merely to present a simplified example of how an adaptive media object might be used.

As such, in shots 600, one or more members of group 602 may select to be represented by adaptive media object 610 as a photograph of a single member or representative member. In addition to, or instead of, the one or more members of group 602 may select to be represented by an avatar coffee cup shown as adaptive media object 603.

As activities, behaviors, and/or actions are performed by one or more members, the adaptive media object 603's configuration may dynamically change in real-time. For example, it might be that information about the member(s)' activities, behaviors, and/or actions, indicate that the represented group is traveling. In this example, the adaptive media object's configuration change may be reflected by configuration 604 with animated legs indicating the cup is walking.

Similarly, information about the member(s)' activities, behaviors, and/or actions, indicate that the represented group is drinking a lot of coffee and/or sending an increasing number of messages. As such, in this example, the adaptive media object's configuration change may be reflected by configuration 605 as jittery, and with its mouth moving at different rates to provide text, sound, or the like. In one embodiment, the jitters may increase as the information received indicates an increase in consumed coffee. Moreover, in one embodiment, sensors on a real world coffee cup might cause the real world coffee cup to vibrate, or increase a vibration, based on the changes in the persona of the group or individual being represented.

Moreover, in one embodiment, the adaptive media object may be configured to evolve over time, such that long term effects of the individual or group's actions, activities, behaviors, or the like, may significantly alter the appearance of the adaptive media object. In one embodiment, such evolution could be configured to be nonreturnable to an original state. For example, as shown in configuration 606, the appearance of the adaptive media object as a coffee cup might evolve into a coffee bean, or the like.

Similarly, the configuration of adaptive media object 610 might change as shown by configuration 611 to reflect, for example, a result of a competition, game, or the like.

Moreover, use of the adaptive media object may include opportunities for brands to interact and communicate with individuals, and/or groups with common interests, with the adaptive media object changing its configuration to reflect brand affiliation, and to act as a single point of contact for the brand. Advertisers, marketers, and the like, may also communicate with the adaptive media object as a mechanism for communicating advertisements, marketing information, or the like, to a selective market segment.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for use in managing social networking communications over a network, comprising:
   a plurality of client devices, each client device being associated with a member of a same group, and useable to provide information about at least one of an action, behavior, or activity of the respective member; and
   a network device that is configured to perform actions, including:
      enabling at least one member of the group to identify an adaptive media object to represent a real-time collective persona of the group;
      providing the identified adaptive media object over the network in a first configuration;
      receiving information about the at least one action, behavior, or activity of at least one member of the group;
      automatically determining, in real-time, a second configuration for the adaptive media object based on the received information; and
      providing the adaptive media object over the network in the second configuration, wherein the second configuration represents a real-time change in the collective persona of the group.

2. The system of claim 1, wherein receiving information about the at least one action, behavior, or activity further comprises receiving information about at least one action, behavior, or activity performed offline by at least one member.

3. The system of claim 1, wherein determining the second configuration further comprises employing a machine learning algorithm to map in real-time the information about the at least one action, behavior, or activity to a change in appearance of the adaptive media object.

4. The system of claim 1, wherein determining the second configuration further comprises selectively weighting the received information about the at least one action, behavior, or activity such that the second configuration represents the collective persona of a majority of members of the group.

5. The system of claim 1, wherein the network device that is configured to perform actions, further including:
   searching for a second adaptive media object over the network;
   if the second adaptive media object is detected, automatically communicating with the second adaptive media object through the adaptive media object;
   dynamically, in real-time, determining a third configuration for the adaptive media object based on the communication with the second adaptive media object; and
   providing the adaptive media object over the network in the third configuration.

6. The system of claim 1, wherein the network device that is configured to perform actions, further including:
   employing the adaptive media object to enable a communication to be received from a non-member of the group;

dynamically, in real-time, determining a third configuration for the adaptive media object based on the communication with the non-member of the group; and
providing the adaptive media object over the network in the third configuration.

7. A network device for use in managing social network communications over a network, comprising:
   a memory for use in storing data and machine instructions;
   a processor in communication with the memory and is configured to receive data and machine instructions that enable the processor to perform actions, including:
      providing over the network for display in a first configuration, an adaptive media object that is configured and arranged to represent a real-time collective persona of members of a group;
      receiving information about at least one action, behavior, or activity of at least one member of the group;
      automatically determining, in real-time, a second configuration for the adaptive media object based on the received information; and
      providing over the network for display the adaptive media object in the second configuration, wherein the second configuration represents a real-time change in the collective person a of the group.

8. The network device of claim 7, wherein displaying the adaptive media object further comprises:
   determining a characteristic of a computing device on which the adaptive media object is to be displayed;
   determining a third configuration based on the determined characteristic and the second configuration, wherein the third configuration is different from the second configuration is more than a size or resolution change; and
   providing in the third configuration the adaptive media object for display on computing device.

9. The network device of claim 7, wherein determining the second configuration further comprises:
   receiving from the at least one member of the group a mapping indicating configurations to be selected for the adaptive media object based on a mapped action, behavior, or activity; and
   employing the mapping to select the second configuration based on a weighting of the information about the at least one action, behavior, or activity.

10. The network device of claim 7, wherein receiving information about at least one action, behavior, or activity of the at least one member of the group further comprises receiving information about at least one offline action, behavior, or activity of the at least one member of the group.

11. The network device of claim 7, wherein the processor to perform actions, further including:
   searching, by the adaptive media object, for a second adaptive media object over the network;
   if the second adaptive media object is detected, automatically communicating with the second adaptive media object;
   dynamically, in real-time, determining a third configuration for the adaptive media object based on the communication with the second adaptive media object; and
   providing in the third configuration the adaptive media object over the network.

12. The network device of claim 7, wherein the processor performs actions, further including:
   providing over the network to a remote sensor the first configuration useable to generate at least one of an action, sound, or change in appearance of a physical object; and
   providing over the network to the remote sensor the second configuration useable to further generate at least one of another action, sound, or another change in appearance of the physical object.

13. A method for use in managing a social networking communications over a network, comprising:
   providing over the network in a first configuration, an adaptive media object that is configured and arranged to represent a real-time collective persona of members of a group;
   receiving information about at least one action, behavior, or activity of at least one member of the group;
   automatically determining, in real-time, a second configuration for the adaptive media object based on the received information; and
   providing over the network the adaptive media object in the second configuration, wherein the second configuration represents a real-time change in the collective persona of the group.

14. The method of claim 13, wherein the adaptive media object further comprises at least one of a graphic, a photograph, an avatar, text, a video, or an audio clip.

15. The method of claim 13, further comprising:
   enabling the adaptive media object to search and communicate with a second adaptive media object; and
   providing over the network the adaptive media object in a third configuration, wherein the third configuration represents a real-time change in the persona of the at least one person based, in part, on the communication with the second adaptive media object.

16. The method of claim 13, further comprising:
   employing the adaptive media object to enable a communication with a person unrelated to the adaptive media object; and
   providing over the network the adaptive media object in a third configuration, wherein the third configuration represents a real-time change in the collective persona of the group based, in part, on the communication with the person unrelated to the adaptive media object.

17. The method of claim 13, wherein determining the second configuration further comprises employing a machine learning algorithm to map the information about the at least one action, behavior, or activity to a change in the adaptive media object.

18. A mobile device for use in managing a social networking communication over a network, comprising:
   a memory for use in storing data and machine instructions;
   a processor in communication with the memory and is configured to receive data and machine instructions that enable the processor to perform actions, including:
      enabling a user of the mobile device and a member of a group of users to become identified with an adaptive media object that is accessible over the network the adaptive media object being arranged further to represent a collective persona of the group of users;
      receiving the adaptive media object in a first configuration;
      providing at least one of an action, behavior, or activity of the user over the network; and
      receiving the adaptive media object in a second configuration that is configured and arranged to automatically represent a real-time change in the collective persona based, in part, on the provided at least one action, behavior, or activity.

19. The mobile device of claim 18, wherein the adaptive media object further comprises at least one of an avatar, a photograph, an audio clip, or a video clip that is further modified for use on the apparatus based on at least one characteristic of the apparatus, and wherein the modification is more than a size or resolution change.

20. The mobile device of claim 18, wherein the processor to perform actions, further including:

enabling the user to provide a plurality of configurations of the adaptive media object and a mapping between each configuration in the plurality of configurations and at least one action, behavior, or activity.

21. The mobile device of claim 18, wherein the adaptive media object is configured and arranged to enable communications between at least one of a second adaptive media object or a user unrelated to the adaptive media object.

22. A processor readable medium that includes data and instructions, wherein the execution of the instructions on a network device provides for a social networking communication over a network by enabling actions, comprising:

enabling at least one member of a group to identify an adaptive media object to represent a real-time collective persona of the group;

providing the identified adaptive media object over the network in a first configuration;

receiving information about the at least one action, behavior, or activity of at least one member of the group;

automatically determining, in real-time, a second configuration for the adaptive media object based on the received information; and providing the adaptive media object over the network in the second configuration, wherein the second configuration represents a real-time change in the collective persona of the group.

23. The processor readable medium of claim 22, wherein the enabled actions, further comprising:

providing information about the first configuration or the second configuration to a remote sensor useable to enable the sensor to perform at least one of an action, a sound, or to change an appearance of a physical object.

24. The processor readable medium of claim 22, wherein the enable actions, further comprising:

providing information about the first configuration or the second configuration for the adaptive media object to a remote at least one of an electronic billboard, remote sensor.

* * * * *

UNITED STATES PATENT AND TRADEMARK OFFICE
CERTIFICATE OF CORRECTION

| | | |
|---|---|---|
| PATENT NO. | : 7,895,049 B2 | |
| APPLICATION NO. | : 11/948190 | |
| DATED | : February 22, 2011 | |
| INVENTOR(S) | : Joseph J. O'Sullivan | |

It is certified that error appears in the above-identified patent and that said Letters Patent is hereby corrected as shown below:

In column 1, line 63, after "invention" insert -- ; --.

In column 2, line 41, delete "otherwise," and insert -- otherwise. --, therefor.

In column 2, line 46, delete ""sin"" and insert -- "in" --, therefor.

In column 2, line 48, delete "commnunity"" and insert -- community" --, therefor.

In column 7, line 11, delete "fall" and insert -- full --, therefor.

In column 9, line 17, after "may" insert -- also execute server-side scripts (CGI scripts, JSPs, ASPs, and so forth) that provide functions such --.

In column 10, line 67, delete "internet" and insert -- Internet --, therefor.

In column 11, line 1, delete "(UVVB)," and insert -- (UWB), --, therefor.

In column 13, line 5, delete "24513" and insert -- 245B --, therefor.

In column 19, line 55, delete "nonreturnable" and insert -- non-returnable --, therefor.

In column 21, line 24, in Claim 7, delete "person a" and insert -- persona --, therefor.

Signed and Sealed this
Twenty-second Day of November, 2011

David J. Kappos
*Director of the United States Patent and Trademark Office*